United States Patent
Henry

(10) Patent No.: US 7,409,819 B2
(45) Date of Patent: Aug. 12, 2008

(54) GAS TURBINE ENGINE AND METHOD OF ASSEMBLING SAME

(75) Inventor: John Leslie Henry, Westchester, OH (US)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 10/976,382

(22) Filed: Oct. 29, 2004

(65) Prior Publication Data

US 2006/0090448 A1    May 4, 2006

(51) Int. Cl.
F02C 3/20    (2006.01)
F02K 3/072   (2006.01)
F02C 3/067   (2006.01)

(52) U.S. Cl. .................... 60/204; 60/226.1; 60/268; 60/39.162; 60/796

(58) Field of Classification Search .......... 60/268, 60/39.162, 204, 226.1, 796–798
See application file for complete search history.

(56) References Cited

U.S. PATENT DOCUMENTS

| | | | | |
|---|---|---|---|---|
| 3,673,802 A * | 7/1972 | Krebs et al. ............ 60/268 |
| 3,703,081 A * | 11/1972 | Krebs et al. ........... 60/268 |
| 3,823,553 A * | 7/1974 | Smith .................. 60/39.08 |
| 4,453,784 A * | 6/1984 | Kildea et al. ............ 184/6.11 |
| 4,976,102 A * | 12/1990 | Taylor ................. 60/39.162 |
| 5,361,580 A * | 11/1994 | Ciokajlo et al. .......... 60/268 |
| 5,443,590 A * | 8/1995 | Ciokajlo et al. .......... 60/268 |
| 5,806,303 A | 9/1998 | Johnson |
| 5,809,772 A | 9/1998 | Giffin, III et al. |
| 5,813,214 A | 9/1998 | Moniz et al. |
| 5,867,980 A | 2/1999 | Bartos |
| 5,971,706 A * | 10/1999 | Glista et al. ............ 415/229 |
| 6,619,030 B1 * | 9/2003 | Seda et al. ............ 60/226.1 |
| 6,684,626 B1 | 2/2004 | Orlando et al. |
| 6,711,887 B2 | 3/2004 | Orlando et al. |
| 6,732,502 B2 | 5/2004 | Seda et al. |
| 6,739,120 B2 | 5/2004 | Moniz et al. |
| 6,763,652 B2 | 7/2004 | Baughman et al. |
| 6,763,653 B2 | 7/2004 | Orlando et al. |
| 6,763,654 B2 | 7/2004 | Orlando et al. |
| 2003/0097844 A1 * | 5/2003 | Seda ................... 60/791 |

\* cited by examiner

*Primary Examiner*—Ted Kim
(74) *Attorney, Agent, or Firm*—William Scott Andes; Armstrong Teasdale LLP

(57) ABSTRACT

A method of assembling a gas turbine engine that includes rotatably coupling a first low-pressure turbine rotor to a high-pressure turbine, rotatably coupling a second low pressure turbine rotor to the first low-pressure turbine rotor, and rotatably coupling the second low-pressure turbine rotor to a turbine rear-frame such that a weight of the high-pressure turbine is transmitted to the turbine rear-frame.

18 Claims, 2 Drawing Sheets

GAS TURBINE ENGINE AND METHOD OF ASSEMBLING SAME

STATEMENT REGARDING FEDERALLY SPONSORED RESEARCH & DEVELOPMENT

The U.S. Government may have certain rights in this invention pursuant to contract number MDA972-01-3-002 and F33615-01-C-2184.

BACKGROUND OF THE INVENTION

This invention relates generally to gas turbine engines, and more specifically to methods and apparatus for assembling gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high pressure turbine. The high-pressure compressor, combustor and high-pressure turbine are sometimes collectively referred to as the core engine. In operation, the core engine generates combustion gases which are discharged downstream to a low pressure turbine that extracts energy therefrom for powering the forward and aft fan assemblies. Within at least some known gas turbine engines, at least one turbine rotates in an opposite direction than the other rotating components within the engine.

At least one known gas turbine engine includes a mid turbine frame to support the high pressure turbine, at least one intermediate pressure turbine, and a turbine rear frame to support a second low pressure turbine. During engine assembly, such known gas turbines are assembled such that the high pressure turbine is coupled forward of the turbine mid frame and the at least one intermediate pressure turbine is coupled aft of the turbine mid frame.

Accordingly, to provide the necessary structural strength to the engine, within such engines, the turbine mid frame structurally supports the high pressure turbine and the intermediate turbine. During operation, the cycle temperatures within the gas turbine engine generate an increased temperature at the turbine mid-frame. As such, additional cooling is supplied to the turbine mid-frame to facilitate reducing an operating temperature of the turbine mid-frame.

BRIEF DESCRIPTION OF THE INVENTION

In one aspect, a method of assembly a gas turbine engine is provided. The method includes rotatably coupling a first low-pressure turbine rotor to a high-pressure turbine, rotatably coupling a second low pressure turbine rotor to the first low-pressure turbine rotor, and rotatably coupling the second low-pressure turbine rotor to a turbine rear-frame such that a weight of the high-pressure turbine is transmitted to the turbine rear-frame.

In another aspect, a gas turbine engine is provided. The gas turbine engine includes a high-pressure turbine, a first low-pressure turbine rotor rotatably coupled to the high-pressure turbine, a second low pressure turbine rotor rotatably coupled to the first low-pressure turbine rotor, and a turbine rear-frame rotatably coupled to the second low-pressure turbine rotor such that a weight of the high-pressure turbine is transmitted to the turbine rear-frame.

DETAILED DESCRIPTION OF THE INVENTION

Figure 1:
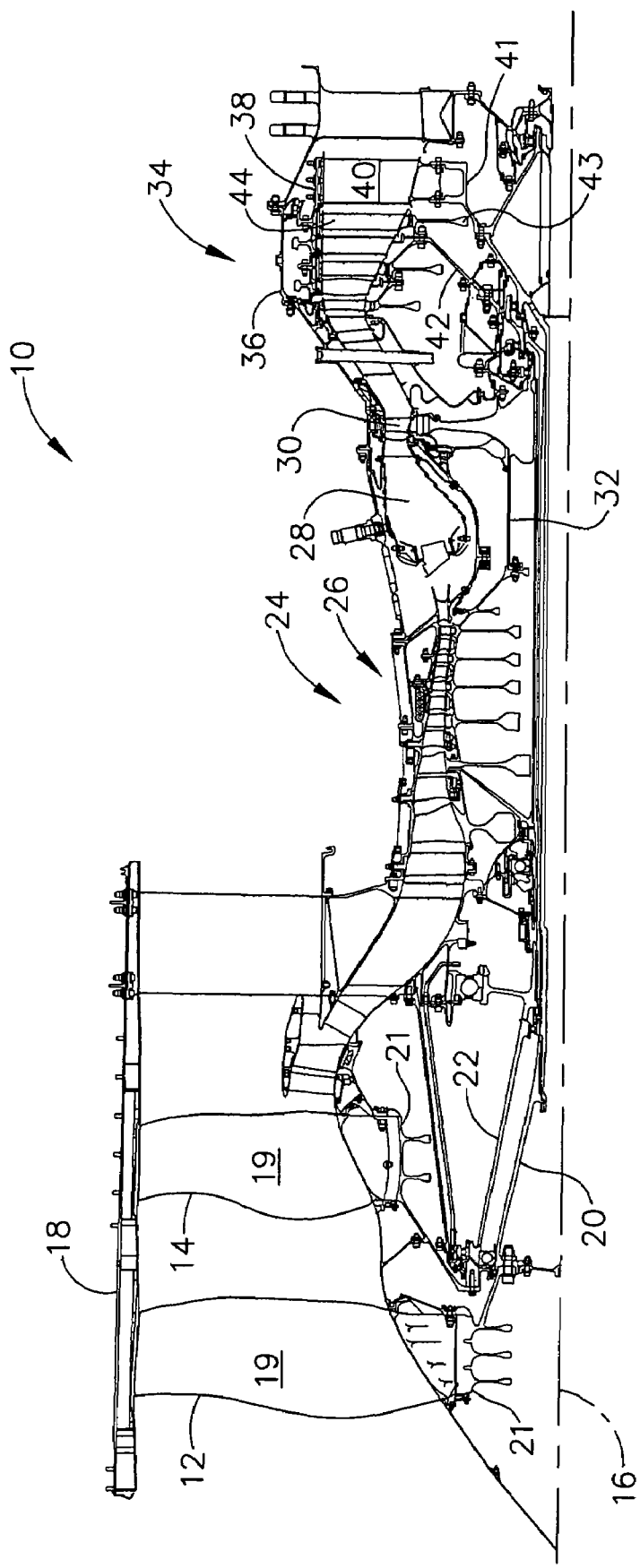
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that fan assembly 12 is coupled axially upstream from fan assembly 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to an exemplary counter-rotating low-pressure turbine 34 which extracts energy from the gases for powering fan assemblies 12 and 14 through their respective fan shafts 20 and 22.

Low-pressure turbine 34 includes a stationary outer casing 36 that is coupled to core engine 24 downstream from high-pressure turbine 30 (shown in FIG. 1). Low-pressure turbine 34 includes a radially outer rotor 38 that is positioned radially inwardly of outer casing 36. Outer rotor 38 has a generally frusto-conical shape and includes a plurality of circumferentially-spaced rotor blades 40 that extend radially inwardly. Blades 40 are arranged in axially-spaced blade rows or stages 41. Although, the exemplary embodiment only illustrates three stages 41, it should be realized that outer rotor 38 may have any quantity of stages 41 without affecting the scope of the method and apparatus described herein.

Low-pressure turbine 34 also includes a radially inner rotor 42 that is aligned substantially coaxially with respect to, and radially inward of, outer rotor 38. Inner rotor 42 includes a plurality of circumferentially-spaced rotor blades 44 that extend radially outwardly and are arranged in axially-spaced rows 43. Although, the exemplary embodiment only illustrates three stages, it should be realized that inner rotor 42 may have any quantity of rows 43 of blades 44 without affecting the scope of the method and apparatus described herein.

In the exemplary embodiment, inner rotor blades 44 extending from stages 43 are axially-interdigitated with outer rotor blades 40 extending from stages 41 such that inner rotor stages 43 extend between respective outer rotor stages 41. The blades 40 and 44 are therefore configured for counter-rotation of the rotors 38 and 42.

Figure 2:
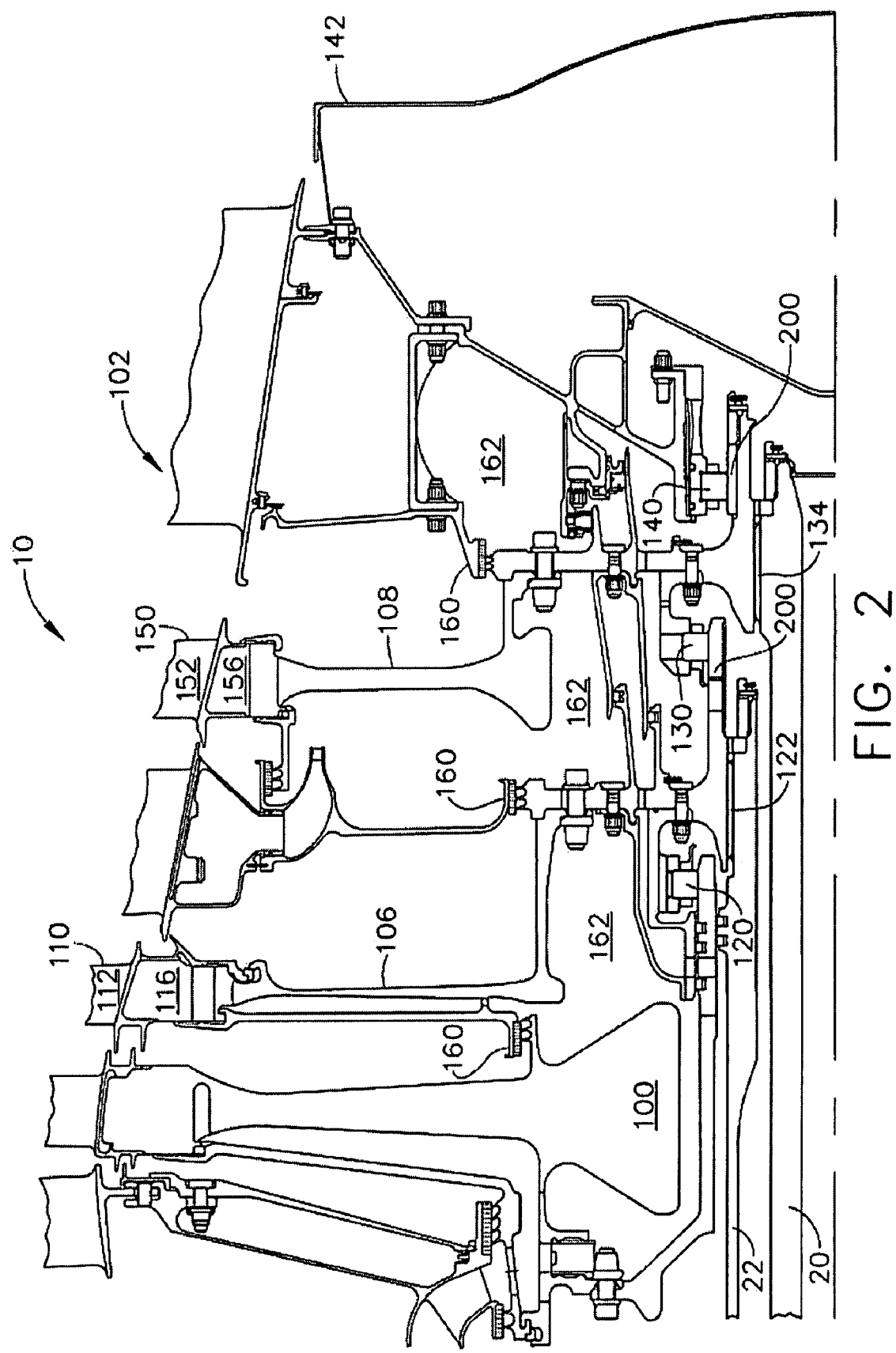
FIG. 2 is an enlarged cross-sectional view of a portion of the gas turbine engine shown in FIG. 1 that includes an exemplary high-pressure turbine, and an exemplary low-pressure turbine.

FIG. 2 is an enlarged cross-sectional view of a portion of gas turbine engine 10 including an exemplary high-pressure turbine 100 and an exemplary low-pressure turbine 102.

In the exemplary embodiment, low-pressure turbine 102 includes a first turbine rotor 106 and a second turbine rotor 108. In the exemplary embodiment, first turbine rotor 106 is positioned axially forward of second turbine rotor 108 and axially aft of high-pressure turbine 100. First turbine rotor 106 includes a plurality of circumferentially-spaced turbine blades 110 that are each mounted at a blade root end 116 and extend radially outwardly. Blades 110 are arranged in an axially-spaced row 112 of turbine blades 110. Although, the exemplary embodiment illustrates only a single row 112 of turbine blades 110, it should be realized that first turbine rotor 106 may have any quantity of rows 112 of turbine blades 110 without affecting the scope of the method and apparatus described herein. In the exemplary embodiment, first turbine rotor 106 rotates in a first rotational direction.

In the exemplary embodiment, second turbine rotor 108 is positioned axially aft of first turbine rotor 106 and is configured to rotate in a second rotational direction that is opposite the first rotational direction of first turbine rotor 106. Second turbine rotor 108 includes a plurality of circumferentially-spaced turbine blades 150 that are each mounted at a blade root end 156 and extend radially outwardly. Blades 150 are arranged in an axially-spaced row 152 of turbine blades 150. Although, the exemplary embodiment illustrates only one row 152 of turbine blades 150, it should be realized that second turbine rotor 108 may have any quantity of rows 152 of turbine blades 150 without affecting the scope of the method and apparatus described herein.

In the exemplary embodiment, gas turbine 10 includes a first differential bearing 120 that rotatably couples high-pressure turbine 100 to first turbine rotor 106. More specifically, differential bearing 120 is rotatably coupled between high-pressure turbine 100 and first turbine rotor 106 such that first turbine rotor 106 is directly rotatably coupled to high-pressure turbine 100. First turbine rotor 106 is coupled to shaft 22, using a plurality of splines 122 for example, such that first turbine rotor 106 is coupled to aft fan assembly 14 via shaft 22. Accordingly, and in the exemplary embodiment, gas turbine engine 10 does not include a turbine mid-frame, rather coupling low-pressure first turbine rotor 106 directly to high-pressure turbine 100 facilitates eliminating the need for a turbine mid-frame.

Gas turbine engine 10 also includes a second differential bearing 130 that rotatably couples first turbine rotor 106 to second turbine rotor 108. More specifically, differential bearing 130 is rotatably coupled between first turbine rotor 106 and second turbine rotor 108 such that first turbine rotor 106 is directly rotatably coupled to second turbine rotor 108. Second turbine rotor 108 is coupled to shaft 20, using a plurality of splines 134 for example, such that second turbine rotor 108 is coupled to forward fan assembly 12 via shaft 20.

Gas turbine engine 10 also includes a third bearing 140 that rotatably couples second turbine rotor 108 to a turbine rear-frame 142. More specifically, bearing 140 is rotatably coupled between second turbine rotor 108 and turbine rear-frame 142 such that second turbine rotor 108 is directly rotatably coupled to turbine rear-frame 142. In the exemplary embodiment, third bearing 140 is a roller bearing. Accordingly, and in the exemplary embodiment, gas turbine engine 10 does not include a turbine mid-frame, rather rotatably coupling high-pressure turbine 100 to turbine rear-frame 142, via turbine first and second turbine rotors 106 and 108, facilitates eliminating the need for a turbine mid-frame.

In the exemplary embodiment, bearings 120 and 130 are differential bearings that facilitate two components, such as first and second turbine rotors 106 and 108, to rotate at two rotational speeds. Specifically, differential bearing 120 facilitates allowing high-pressure turbine 100 to operate at a first rotational speed and first turbine rotor 106 to operate a second different rotational speed. Differential bearing 130 facilitates allowing first turbine rotor 106 to operate at a first rotational speed and second turbine rotor 108 to operate a second different rotational speed. Accordingly, differential bearing 130 facilitates allowing forward fan assembly 12 to operate at a first rotational speed, and aft fan assembly 14 to operate at a second different rotational speed. In the exemplary embodiment, shaft 22 operates a first rotational speed, and shaft 20 operates at a second rotational speed that is less than the first rotational speed of shaft 22. Accordingly, and in the exemplary embodiment, shaft 20, operating at a higher rotational speed, is positioned radially inward from shaft 22, operating at a lower rotational speed, to facilitate improving assembly of gas turbine engine 10.

In one embodiment, at least one of bearings 120, 130, and/or 140 is a roller bearing. In another embodiment, at least one of bearings 120, 130, and/or 140 is a ball bearing. In a further embodiment, at least one of bearings 120, 130, and/or 140 is a foil bearing.

In operation, high-pressure turbine 100 is rotatably coupled to low pressure first turbine rotor 106 which is rotatably coupled to low-pressure second turbine rotor 108, which is rotatably coupled to turbine rear frame 142. Accordingly during operation, gas turbine engine 10 is initialized thus rotating high-pressure turbine 100. Since high-pressure turbine 100 is rotatably coupled to first turbine rotor 106 which is rotatably coupled to second turbine rotor 108 and turbine rear-frame 142, rotational forces and/or rotor loads are transmitted from high-pressure turbine 100 to turbine rear-frame 142 via low pressure first and second turbine rotors 106 and 108 respectively, whereas at least one known gas turbine engine transmits the high-pressure turbine rotor load to a turbine mid-frame.

In the exemplary embodiment, removing the turbine mid-frame and directly rotatably coupling high-pressure turbine 100 to low-pressure first turbine rotor 106 facilitates assembling gas turbine engine 10 such that oil supplied to shafts 20 and 22 via an oil supply system 200 that includes splines 122 and 134, is scavenged back to turbine rear frame 142. Moreover, and in the exemplary embodiment, gas turbine engine 10 includes a plurality of inner shaft carbon seal rings 160 that are configured to seal the rotating sumps 162, thereby allowing bearings 120, 130, and 140 to be positioned closer to the rotating mass they support.

The exemplary embodiments described above illustrate a counter-rotating low pressure turbine wherein high-pressure turbine 100 is directly rotatably coupled to low-pressure first and second turbine rotors 106 and 108 respectively such that rotational forces and/or rotor loads generated from high-pressure turbine 100 are transmitted from high-pressure turbine 100 to turbine rear-frame 142 via low pressure first and second turbine rotors 106 and 108. Moreover, because gas turbine engine 10 does not include a turbine mid-frame, oil in system 200 for bearings 120, 130, and 140 is routed directly to turbine rear-frame 142 thus reducing the engine complexity and fabrication costs.

The above-described methods and apparatus are cost-effective and highly reliable methods installing a differential bearing between the high-pressure turbine and the low-pressure turbine such that a turbine mid-frame is not required. Utilizing a differential bearing instead of a turbine mid-frame facilitates removing metal in the hot gas flowpath that requires cooling, reducing engine weight, and cost. Moreover, oil that is supplied to the low-pressure turbine shafts is scavenged back to the cooler and larger turbine rear frame thus increasing engine reliability. Moreover, since the oil supplied to differential bearings is routed through the shaft splines at the major diameters, no oil holes are required through the shafts, and inner shaft carbon seal rings are utilized to seal the rotating sumps. The above described methods and apparatus also facilitate allowing the differential bearings to be located much closer to the rotating mass they support.

Exemplary embodiments of turbine differential bearings and methods of assembling a gas turbine engine are described above in detail. The components are not limited to the specific embodiments described herein, but rather, components of each system may be utilized independently and separately from other components described herein.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
    rotatably coupling a first low-pressure turbine rotor to a high-pressure turbine using a first differential bearing coupled between the first low-pressure turbine rotor and the high-pressure turbine, wherein the first low-pressure turbine rotor includes a first plurality of turbine blades, each of the first plurality of blades extending radially outwardly from a root end toward a low-pressure turbine casing;
    rotatably coupling a second low-pressure turbine rotor to the first low-pressure turbine rotor using a second differential bearing coupled between the first low-pressure turbine rotor and the second low-pressure turbine rotor, wherein the second low-pressure turbine rotor includes a second plurality of turbine blades, each of the second plurality of blades extending radially outwardly from a root end toward the low-pressure turbine casing; and
    rotatably coupling the second low-pressure turbine rotor to a turbine rear-frame such that the weight of the high-pressure turbine is transmitted to the turbine rear-frame.

2. A method in accordance with claim 1 wherein rotatably coupling a second low-pressure turbine rotor to a first low-pressure turbine rotor comprises rotatably coupling a second low-pressure turbine rotor that is rotatable in a first rotational direction to a first low-pressure turbine rotor that is rotatable in a second rotational direction that is opposite that of the first rotational direction.

3. A method in accordance with claim 2 further comprising coupling a roller bearing between the second low-pressure turbine rotor and the turbine rear-frame.

4. A method in accordance with claim 1 further comprising channeling oil from the turbine rear frame to the first differential bearing to lubricate the first differential bearing.

5. A method in accordance with claim 1 wherein rotatably coupling a first low-pressure turbine rotor to a high-pressure turbine comprises coupling a first foil differential bearing between the first low-pressure turbine rotor and the high-pressure turbine such that the high-pressure turbine is rotatably coupled to the first low-pressure turbine rotor.

6. A method in accordance with claim 1 further comprising coupling the first low-pressure turbine rotor to an aft fan assembly.

7. A method in accordance with claim 1 further comprising coupling the second low-pressure turbine rotor to a forward fan assembly.

8. A method in accordance with claim 1 further comprising channeling oil from the turbine rear-frame to at least one of the high-pressure turbine, the first low-pressure turbine rotor, and the second low-pressure turbine rotor.

9. A gas turbine engine comprising:
    a high-pressure turbine;
    a first low-pressure turbine rotor rotatably coupled to said high-pressure turbine, wherein a first differential bearing is coupled between said first low-pressure turbine rotor and said high-pressure turbine, said first low-pressure turbine rotor comprises a first plurality of turbine blades, each of said first plurality of blades extending radially outwardly from a root end toward a low-pressure turbine casing;
    a second low-pressure turbine rotor rotatably coupled to said first low-pressure turbine rotor, wherein a second differential bearing is coupled between said first low-pressure turbine rotor and said second low-pressure turbine rotor, said second low-pressure turbine rotor comprises a second plurality of turbine blades, each of said second plurality of blades extending radially outwardly from a root end toward the low-pressure turbine casing; and
    a turbine rear-frame rotatably coupled to said second low-pressure turbine rotor such that the weight of said high-pressure turbine is transmitted to said turbine rear-frame.

10. A gas turbine engine in accordance with claim 9 wherein said first low-pressure turbine rotor is rotatable in a first rotational direction, and said second low-pressure turbine rotor is rotatable in a second rotational direction that is opposite that of the first rotational direction.

11. A gas turbine engine in accordance with claim 10 further comprising a roller bearing coupled between said second low-pressure turbine rotor and said turbine rear-frame.

12. A gas turbine engine in accordance with claim 9 further comprising an oil supply system configured to channel oil from said turbine rear frame to said first differential bearing to lubricate said first differential bearing.

13. A gas turbine engine in accordance with claim 9 further comprising a first differential foil bearing coupled between said first low-pressure turbine rotor and said high-pressure turbine such that said high-pressure turbine is rotatably coupled to said first low-pressure turbine rotor.

14. A gas turbine engine in accordance with claim 9 further comprising an aft fan assembly rotatably coupled to said first low-pressure turbine rotor.

15. A gas turbine engine in accordance with claim 9 further comprising a forward fan assembly rotatably coupled to said second low-pressure turbine rotor, said forward fan assembly configured to rotate in a rotational direction that is different than an aft fan assembly.

16. A gas turbine engine in accordance with claim 9 further comprising an oil supply system configured to channel oil from said turbine rear-frame to at least one of said high-pressure turbine, said first low-pressure turbine rotor, and said second low-pressure turbine rotor.

17. A method in accordance with claim 1 further comprising:
- coupling the first low-pressure turbine rotor to a first shaft using a first spline; and
- coupling the second low-pressure turbine rotor to a second shaft using a second spline.

18. A method in accordance with claim 17 further comprising:
- channeling oil to the first differential bearing via the first spline; and
- channeling oil to the second differential bearing via the second spline.

* * * * *